Sept. 26, 1944.   A. B. WHITE   2,359,178
WELDING SYSTEM
Filed May 8, 1943

INVENTOR
Alfred B. White.
BY
ATTORNEY

Patented Sept. 26, 1944

2,359,178

UNITED STATES PATENT OFFICE 2,359,178

WELDING SYSTEM

Alfred B. White, Murrysville, Pa., assignor to Westinghouse Electric & Manufacturing Company, East Pittsburgh, Pa., a corporation of Pennsylvania Application May 8, 1943, Serial No. 486,232

12 Claims. (Cl. 219—4)

My invention relates, generally, to welding systems and it has reference in particular to stored energy welding systems.

Generally stated, it is an object of my invention to provide a stored energy resistance welding system that is simple and inexpensive to manufacture and economical to operate.

More specifically, it is an object of my invention to provide for storing electrical energy in an oscillatory circuit energized from an alternating current source before utilizing it for effecting a welding operation.

It is also an object of my invention to provide for preventing the usually large amount of energy transfer between the condenser of condenser type stored energy welding systems and the source of alternating current during the period between charging the condenser and discharging it to perform a welding operation.

Another object of my invention is to provide for effectively increasing the impedance of the charging circuit in a reactance type stored energy welding system so as to limit the interchange of energy between the storage device and alternating current source during the interval between charging the device and discharging it to perform a welding operation.

Yet another object of my invention is to provide for combining with the reactance energy storing device of a stored energy resistance welding system, a reactance having an opposite phase angle so as to provide an oscillatory energy reservoir for storing energy during the interval between charging the storage device and dischaging it to effect the welding operation.

Still another object of my invention is to provide for connecting a reactor with the condenser of a stored energy welding system to provide a parallel tuned storage circuit having a natural frequency substantially equal to the frequency of the source.

Other objects will in part be obvious, and will in part be explained hereinafter.

In accordance with one embodiment of my invention, a reactor is connected in parallel circuit relation with the condenser of a condenser type stored energy welding system to provide a parallel resonant energy storage circuit. This storage circuit permits the energy stored therein to oscillate between the condenser and reactor during the interval between the charging of the storage circuit and discharging it to perform a welding operation. Instead of permitting a relatively free interchange of energy between the condenser and the source during the interval between charging and discharging of the condenser to perform a welding operation, with the resultant flow of a relatively heavy current from the source, only a relatively small current is drawn from the source to supply the losses in the oscillatory storage circuit.

For a more complete understanding of the nature and scope of my invention reference may be had to the accompanying drawing, in which.

Figure 1:
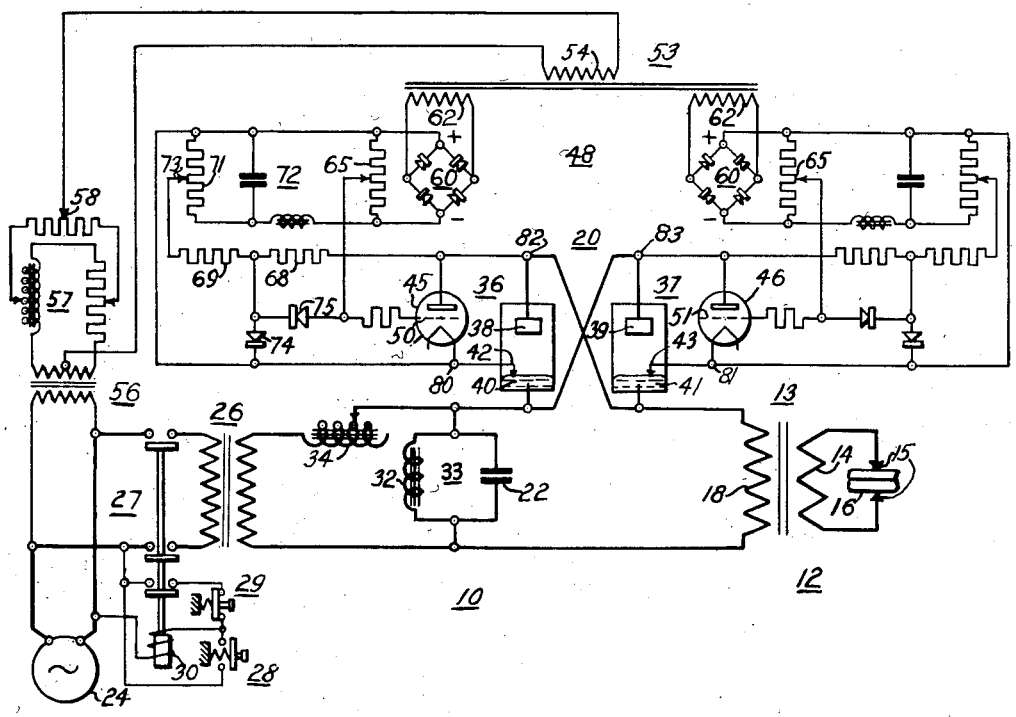
Figure 1 is a diagrammatic view of a stored energy type resistance welding system embodying the principal features of one embodiment of my invention.

Referring to Fig. 1, the reference numeral 10 denotes, generally, a stored energy resistance welding system including a welding circuit 12 comprising a welding transformer 13 having a secondary winding 14 connected to electrodes 15 for engaging work 16 upon which a welding operation is to be performed and a primary winding 18 connected by switch means 20 to an energy storage condenser 22 which is connected to a source of alternating current 24 through a transformer 26 and a primary switch means 27. The primary switch means 27 is utilized to connect the transformer 26 to the source 24 and may be controlled by a normally open "start" switch 28 and a normally closed "stop" switch 29 connected to control the energization of the operating winding 30 of the switch means.

In order to improve the operating characteristics of the energy storage circuit and to minimize the current drawn by the condenser 22 from the source during intervals which may occur between the charging of the condenser and the discharging thereof to perform a welding operation, a reactance device having a phase angle opposite to that of the condenser 22 may be connected in parallel circuit relation with the condenser to provide in conjunction therewith an oscillatory storage circuit. For example, a condenser may be used with an inductive reactance device, and a reactor 32 may be connected in parallel circuit relation with the condenser 22, having an inductive reactance substantially equal to the capacitive reactance of the condenser at the frequency of the source 24, the inductive reactance being for example, slightly less than the capacitative reactance. Impedance means in the form of a reactor 34 may be connected in series circuit relation with the oscillatory storage circuit 33 and the source to control the charging rate of the condenser and the rate of current flow from the source.

The switch means 20 controlling the connection of the welding transformer 13 to the condenser 22 may comprise a pair of arc discharge devices 36 and 37 having anodes 38, 39 and cathodes 40, 41 inversely connected between the transformer 13 and the energy storage circuit 33, and control electrodes 42 and 43, respectively. The conductivity of the arc discharge devices 36 and 37 may be controlled by means of control valves 45 and 46 connected between the anodes and control electrodes of the arc discharge devices 36 and 37, respectively. Control means denoted, generally, by the numeral 48 may be provided for applying suitable bias voltages to the control electrodes 50 and 51 of the control valves 45 and 46 in order to render them conductive under predetermined conditions.

Since the control means for each of the control valves may be identical, it will be necessary to describe in detail only that portion for the control valve 45 and the same numerals will be used to indicate similar portions of the control means for the control valve 46. A control transformer 53 may be provided for producing an alternating current control voltage substantially proportional to the voltage of the source 24. The primary winding 54 of the control transformer 53 may be connected to the source 24 by means of an auxiliary transformer 56 and a phase shifting circuit 57 having an adjustable tap 58, whereby the phase relation between the control voltage and that of the source may be varied. Rectifier circuits 60 may be provided in connection with the secondary windings 62 of the control transformer 53. Voltage dividers 65 may be provided with each of the rectifier circuits for applying substantially unidirectional pulsating negative bias voltages to the control electrodes 50 and 51 of the control valves to prevent them from becoming conductive except in different predetermined relations to the voltage of the source 24.

While the energy of the oscillatory storage circuit 33 may be discharged through the primary winding 18 of the welding transformer 13 either when the energy is stored principally in the condenser or in the reactor, or is divided between them, provision may be made for discharging the oscillatory storage circuit when the energy thereof is contained substantially entirely in the condenser 22, by rendering the arc discharge devices 36 and 37 conductive when the voltage of the storage circuit is at substantially a maximum. For this purpose control resistors 68 and 69 may be connected between the anodes 38 and 39 of the arc discharge devices 36 and 37 and the control electrodes 42 and 43 thereof to provide control voltages substantially proportional to the voltage across the oscillatory discharge circuit 33.

In order to produce bias voltages proportional to the voltage of the oscillatory storage circuit 33 and sufficiently negative with respect to the voltage of the cathode of the control valve 45 to maintain the control valve non-conductive until different predetermined points in the energy storage circuit voltage wave, substantially constant direct current control voltages may be applied to control electrodes 50 and 51 together with the alternating current control voltages from the storage circuit by connecting the control resistor 69 to a control resistor 71 connected across the rectifier circuit 60 and provided with filter means 72, by means of an adjustable top 73. A rectifier 74 may be connected between the control electrode 50 and the cathode of the control valve 45 to by-pass any relatively high transient potential and prevent them from being applied to the control electrode 50. Means such as the rectifier 75 may be provided in the control electrode circuit for insuring that the pulsating unidirectional control voltage from the source retains control of the valve even though the condenser voltage may be sufficient to allow the valve 45 to become conductive.

Figure 2:
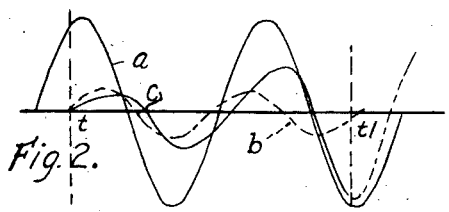
Figs. 2, 3 and 4 are curves showing the various current and voltage conditions in the welding system of Fig. 1.

When the "start" switch 28 is closed to effect energization of the operating winding 30, the switch means 27 operates to connect the transformer 26 to the source 24. The energy storage circuit 33 commences to charge initially as indicated by the courves in Fig. 2 where the curve (a) designates the line voltage and the curves (b) and (c) represent, respectively, the current and voltage waves of the energy storage circuit. Energy is delivered to the storage circuit at a rate determined primarily by the impedance 34. The time for the storage circuit to become fully charged is therefore determined by the impedance 34 and the capacity of the storage circuit. The energy stored in the circuit 33 oscillates between the condenser 22 and the reactor 32 as in any parallel resonant circuit.

Since the initial rate of delivery of energy to storage circuit 33 is limited by the impedance 34, the alternating voltage of the storage circuit increases gradually from the time (t) when the switch 28 closes and reaches its final value at the time (t1) when it may be discharged only after a relatively short interval determined by the time constant of the charging circuit. By making the inductive reactance of the reactor 32 substantially equal to the capacitive reactance of the condenser 22, the final impedance drop across the storage circuit 33 becomes a relatively high percentage of the line voltage and the circuit presents only an effective resistance as regards the source. Since the storage circuit 33 is substantially resonant at the frequency of the source 24 the energy therein oscillates freely between the condenser and the reactor once the steady state condition is reached, and only sufficient energy is drawn from the source to supply the relatively low losses of the storage circuit.

The control valves 45 and 46 are each normally maintained nonconductive except for relatively short intervals in half cycles of opposite polarity when the pulsating negative bias voltage applied thereto from the voltage dividers 65 and the alternating current voltage from the resistors 68 and 69 reach a sufficiently low negative value to permit the valves to conduct and the anode potential of one or the other is positive. This condition is clearly illustrated in Fig. 3 where the curve (a) designates the line voltage and the curve (c) designates, as in Fig. 2, the voltage of the storage circuit 33. These curves represent the conditions existing between the time t2 when a previous discharge of the storage circuit terminated and a subsequent discharge is effected at a time t3. Since in the instance illustrated the condenser or storage circuit voltage requires approximately one and one-half cycles to reach a maximum, the switch means may be readily made to conduct only on every third half cycle so that successive welds are made with discharges of the opposite polarity, merely by retarding the discharge until the condenser voltage reaches a value closely approaching the maximum value. Welds may be made at lesser or greater intervals by varying the position of the tap 73.

The substantially horizontal line (d) may represent the cathode potential of the control valve 45. When the pulsating unidirectional voltage reaches a value such as is designated by where dotted curve (e) rises to the cathode potential line (d), the control valves may become conductive, provided that the negative bias supplied from the control resistors 68 and 69 is not sufficient to prevent the valve from becoming conductive. Because of the rectifier 75, the pulsating voltage cannot actually reach a value above the curve (f) of Fig. 3, which represents the combined negative bias voltage applied to the control electrode 50 from the control resistors 68, 69 and 71. When this negative bias voltage is reduced to substantially the potential of the cathode at the same time the pulsating negative bias voltage from the voltage divider 65 is likewise reduced, such as, for example, at the time (t3), the control valve 45 is rendered conductive.

The control electrode 42 of the arc discharge device 36 is thereby connected across the energy storage circuit 33 so that the arc discharge device 36 is rendered conductive, provided that the anode 38 is at a positive potential. Should the anode 38 be at a negative potential under these conditions, the arc discharge device 37 is rendered conductive and the primary winding 18 of the welding transformer is thereby connected across the energy storage circuit for discharging it to perform a welding operation.

Figure 3:
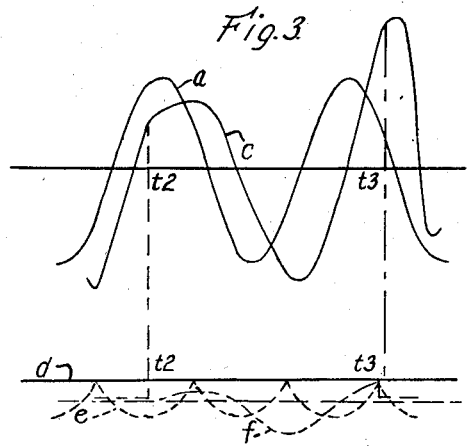

Immediately upon discharge of the energy storage circuit 33 the arc discharge devices 36 and 37 are again rendered nonconductive, as the alternating current bias voltage employed on the control electrodes of the control valves 45 and 46 is reduced to a value below that necessary to maintain the valves conductive on successive half cycles. Accordingly, the storage circuit 33 again charges and is ready for the succeeding welding operation. Since the voltage on the charging circuit 33 is oscillatory during successive half cycles of charging as illustrated in Fig. 3 where the point (t2) indicates the termination of one discharge and the point (t3) indicates a point of initiation of the successive discharge, it is possible, by controlling the bias voltages applied to the control electrodes 50 and 51 of the control valves 50, to effect discharge of the energy storage circuit 33 at substantially an odd number of half cycles such as, for example, every third half cycle. By insuring discharge of the condenser during successive half cycles of opposite polarity at spaced intervals not only are the discharges more suitably timed for performing the necessary welding operations than where discharges take place on successive half cycles, but saturation of the welding transformer core is also prevented. However, it is to be understood that the use of an oscillatory storage circuit is not limited to such timing, and may be used with other timing means which cover relatively wide ranges of welding cycles.

Figure 4:
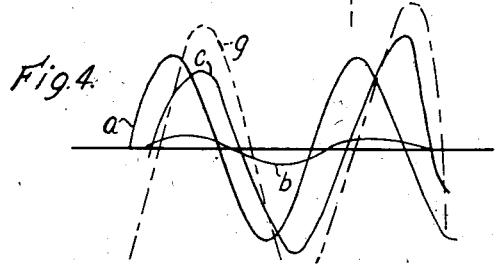

Referring to Fig. 4, the curve (b) designates, as hereinbefore, the line current supplied to the energy storage circuit under substantially steady state conditions, or between the time of charging and discharging of the circuit to perform a welding operation. This value of current is obviously much less than the current represented by the curve (g) which illustrates the proportional value of current drawn by a stored energy type of welder utilizing a condenser alone as an energy storage means under substantially the same conditions. The curve (a) represents, as hereinbefore, the line voltage while the curve (c) represents the voltage of the storage circuit.

Figure 5:
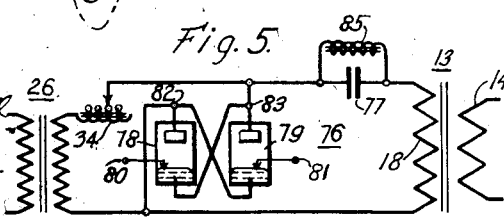
Fig. 5 is a partial diagrammatic view of a stored energy welding system embodying a modification of the invention.

Referring to Fig. 5 the reference numeral 76 may denote, generally, a portion of a stored energy welding system which may be substituted in part for the system shown in Fig. 1. In this instance the storage condenser 77 may be connected in series circuit relation with the primary winding 18 of the welding transformer 13 and in series circuit relation with the secondary winding of the transformer 26. Arc discharge devices 78 and 79 may be inversely connected in shunt relation with the condenser 77 and the primary winding 18 to provide a discharge circuit for the condenser 77. The control circuit for the arc discharge devices 78 and 79 may be substantially the same as that described in connection with the arc discharge devices 36 and 37 of Fig. 1. The terminal points 80, 81, 82 and 83 of Fig. 5 correspond to the terminal points indicated by the same numerals on Fig. 1. In all other respects the control means may be identical.

As described hereinbefore, means such as the reactor 85 may be connected in shunt relation with the storage condenser 77. By making the reactor 85 of such size that the inductive reactance thereof is substantially equal to the capacitive reactance of the condenser 77 at the frequency of the source, a tuned resonant energy storage circuit may be provided which minimizes the drawing of current from the source during the interval between charging and discharging of the condenser for performing a welding operation.

From the above description and the accompanying drawing it will be apparent that I have provided in a simple and effective manner for reducing the amount of energy required by stored energy welding systems where it is not desired or possible to weld always on successive half cycles of the alternating current source. My invention may be utilized in stored energy welding systems of many kinds, whether for arc, spot, seam welding or the like. An energy storage welding system embodying the features of my invention minimizes the current demand required for welding and insures against the transformer core becoming saturated. While the invention has been illustrated in connection with a control system which provides for welding on every third half cycles, it is to be understood that it may be readily used where the interval between welds is either greater or less. The greater the interval, regardless of what form of timing or control means is used, the greater are the benefits realized by systems embodying my invention.

Since certain changes may be made in the above description and different embodiments of the invention may be made without departing from the spirit thereof, it is intended that all the matter contained in the above description and shown in the accompanying drawing shall be considered as illustrative and not in a limiting sense.

I claim as my invention:

1. A welding system comprising, a welding circuit, reactance energy storage means, circuit means connecting the storage means to an alternating current source for charging with alternating current, reactance means of the opposite phase relation connected in shunt circuit relation with the energy storage means to provide an energy power circuit resonant at substantially the frequency of the source, and switch means connecting the energy storage circuit to provide a discharge circuit therefor through the welding circuit.

2. A welding system comprising, a welding circuit, an energy storage condenser disposed to be charged directly from a source of alternating current, an inductive reactance connected across the condenser to provide an oscillatory energy storage circuit for supplying weld current to the welding circuit, and switch means operable to connect the oscillatory energy storage circuit to the welding circuit to provide a discharge circuit therethrough.

3. A resistance welding system comprising, a welding transformer having a secondary winding disposed to be connected to welding electrodes and a primary winding, a power condenser disposed to be connected to a source of alternating current for charging on alternating current, a reactor having an inductance approximately equal to the reactance of the condenser at the source frequency connected in parallel circuit relation with the condenser to provide an oscillatory weld energy storage circuit, and switch means operable to connect the oscillatory storage circuit across the primary winding of the welding transformer at predetermined spaced intervals.

4. An energy storage welding system comprising, a condenser disposed to be connected to a source of alternating current for charging on alternating current, an impedance connected in series circuit relation with the condenser and the source, a welding circuit including a transformer having a primary winding and a secondary winding for supplying welding current to welding electrodes, a reactor connected in shunt relation with the condenser, said reactor having a reactance substantially equal to the reactance of the condenser at the source frequency so as to provide an oscillatory weld energy storage circuit, and switch means connecting the primary winding of the welding transformer across the condenser and reactor when the voltage of the condenser is substantially at a maximum.

5. An energy storage welding system comprising, a welding transformer having a secondary winding for supplying electrical energy to welding electrodes and a primary winding, a condenser disposed to be connected to a source of alternating current in series circuit relation with the primary winding, a reactor connected in shunt relation with the condenser having a reactance substantially equal to the reactance of the condenser at the source frequency so as to provide a near resonant oscillatory energy storage circuit, impedance means connected between the condenser and the source, and switch means providing a shunt discharge path for the condenser connected in bridging relation across the condenser and the primary winding.

6. A power system comprising, a load device, a condenser connected in series circuit relation with the load device and a source of alternating current, a reactor connected across the condenser to provide an oscillatory circuit near resonance at the source frequency, and switch means bridging the condenser and the load device to provide a discharge circuit through the load device.

7. A welding system comprising, a welding transformer having a secondary winding disposed to supply electrical energy to an electrode circuit and a primary winding, a condenser source of welding current disposed to be connected to a source of alternating current, a reactor connected across the condenser to provide a tuned energy storage circuit at the source frequency for substantially preventing discharging of the condenser back to the source during half cycles of non-welding, and synchronous switch means connecting the primary winding across the tuned circuit at a predetermined point in the line voltage wave when the condenser voltage reaches a predetermined value.

8. A power system comprising, a load circuit, a condenser connected to a source of alternating current, a reactor connected in parallel circuit relation with the condenser to provide an oscillatory energy storage circuit, a switch operable to connect the load circuit to the energy storage circuit, and control means including means responsive to control voltages from the source and from the condenser for effecting operation of the switch means.

9. A power system comprising, a reactance energy storage device disposed to be connected to an alternating current source, reactance means having an opposite phase angle to that of the storage device connected in shunt circuit relation with the storage device to provide an energy storage circuit resonant at approximately the source frequency, a load circuit, and switch means operable to connect the energy storage circuit across the load circuit in response to predetermined energy storage conditions of the storage circuit and predetermined voltage conditions of the source.

10. A stored energy welding system comprising, a welding circuit including a welding transformer having a secondary winding for supplying welding current to welding electrodes and a primary winding, a condenser disposed to be connected to a source of alternating current for storing welding energy, a reactor connected in shunt circuit relation with the condenser to provide an oscillatory tank circuit and limit discharge of the condenser into the source on alternate half cycles, a pair of arc discharge devices having control electrodes and a plurality of principal electrodes inversely connected to provide a discharge circuit for the condenser through the primary of the welding transformer, and control means including a pair of control valves responsive to predetermined voltage conditions of the source and the condenser connected to energize the control electrodes at periodic intervals.

11. A stored energy welding system comprising, an energy storing circuit including a condenser disposed to be connected to a source of alternating current, a welding circuit, a pair of arc discharge valve devices inversely connected between the welding circuit and the energy storage circuit to provide a discharge circuit through the welding circuit, a source of alternating control voltage proportional to the voltage of the condenser, an additional source of alternating control voltage proportional to the source voltage, means to rectify the additional control voltage to produce a unidirectional pulsating control voltage and a substantially constant unidirectional voltage, means to vary the phase relation of the pulsating control voltage relative to the source voltage, and circuit means controlling the conductivity of the valve means in accordance with predetermined relations of said control voltages.

12. An energy storage system comprising, a condenser connected to a source of alternating current, a load circuit, switch means operable to connect the load circuit to the condenser, means producing an alternating current control voltage having a controllable phase relation to the source voltage, unidirectional means rectifying the control voltage to produce a unidirectional pulsating control voltage valve means having a control electrode effective at a predetermined minimum negative bias voltage to render the valve means conductive and effect operation of the switch means, circuit means applying a negative bias to the control electrode from the pulsating control voltage, means producing a substantially constant unidirectional control voltage, and circuit means for applying to the control electrode a negative bias voltage proportional to the difference between the constant control voltage and a control voltage proportional to the condenser voltage, whereby the switch means operates to connect the load circuit to the condenser only when the source and condenser voltages are in predetermined phase relation.

ALFRED B. WHITE.